United States Patent Office 3,313,651
Patented Apr. 11, 1967

3,313,651
STYRENE POLYMERS COATED WITH A COMPOSITION COMPRISING POLYVINYL ACETAL, PHENOL-ALDEHYDE RESIN AND POLYMETHYL ETHER OF HEXAMETHYLOL MELAMINE
Richard J. Burns, New Market, N.J., assignor to Union Carbide Corporation, a corporation of New York
No Drawing. Filed Jan. 23, 1964, Ser. No. 339,609
11 Claims. (Cl. 117—138.8)

This invention relates to phenolic-polyvinyl acetal compositions. More particularly, it relates to a phenol-aldehyde condensate-polyvinyl acetal composition crosslinked with polymethyl ethers of hexamethylol melamine and their use as protective coatings for molded styrene polymer substrates.

Styrene polymer objects have innumerable applications, one of which is molded containers for packaging. Their use is curtailed however, with such packaged items as dairy products. This is due to problems connected with crazing of the styrene polymer as a result of attack by chemical constituents of the packaged materials or spoilage of perishable packaged materials as a result of high gas permeability, chiefly oxygen, of the polymer container.

While coatings exist which are resistant to chemical attack and are gas impermeable, they are generally unsuitable for use with styrene polymers for any of a number of reasons some of which are poor adhesion, poor clarity, poor water blush resistance (whitening effect) and poor resistance to attack by solvents. In addition, many of the existing coating compositions must be deposited from solvents which attack styrene polymers. In this regard ethyl alcohol is one of the few solvents which does not attack styrene polymers.

It is, therefore, an object of this invention to provide a coating composition which can be deposited from solvents which do not attack styrene polymers.

A further object is to provide a coating composition which adheres well to styrene polymers.

Another object is to provide a coating composition which resists water blush and solvent attack.

Still another object is to provide a coating composition which exhibits low gas permeability.

Other objects of the invention will become apparent to those skilled in the art upon an examination of the detailed explanation below.

It has been discovered that a curable coating composition, that is one capable of being crosslinked, which is suitable for use as a coating on molded styrene polymer substrates can be prepared from
(1) about 1 part by weight of a polyvinyl acetal resin,
(2) about 4 to 7 parts by weight of a one step, heat-reactive, ethanol-soluble, phenol-aldehyde condensation product,
(3) an amount of a polymethyl ether of hexamethylol melamine sufficient to crosslink or cure the polyvinyl acetal resin and one-step, heat-reactive, ethanol-soluble, phenol-aldehyde condensation product.

Such a composition coated and cured on a styrene polymer substrate accomplishes the objects described above.

The styrene polymer substrates referred to are meant to include any shape or form of polymer such as fiber-shaped articles, films, sheets, shaped and formed articles such as containers and the like fabricated by thermoforming, molding, extruding and the like from styrene homopolymers as well as copolymers of styrene and olefinically unsaturated monomers copolymerizable therewith such as acrylonitrile, butadiene, methyl acrylate, methyl methacrylate, vinyl pyridine, p-methoxystyrene and the like, which are available as general purpose, medium and high-impact resins. Styrene polymers which are particularly adapted to this invention include polystyrene and styrene-acrylonitrile copolymers and particularly the biaxially oriented sheets and fibers prepared therefrom.

The phenol-aldehyde condensation products which can be used in this invention are resole resins. These resins are produced by the condensation of phenols and aldehydes under alkaline conditions. A resole produced by the condensation of phenol with formaldehyde most likely proceeds through an intermediate having the following illustrated type structure:

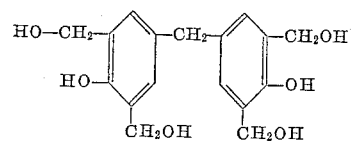

In a typical synthesis, resoles are prepared by heating one mole of phenol with 1.5 moles of formaldehyde with basic catalysts as for example, sodium hydroxide, barium hydroxide or the like.

The resole resins are prepared by the condensation of phenol with an aldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol, 2,2-bis-(p-hydroxyphenyl) propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are methylene engendering agents such as hexamethylenetetramine.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

The most suitable resole resins are those which are insoluble in water, readily soluble in conventional organic solvents such as ethanol as well as in methyl ether ketone, acetone, methanol, and the like. Resole resins having a particularly desirable combination of properties are those which have an average molecular weight in the range between about three hundred fifty to six hundred. It is believed that these resole resins contain an average of at least one free methylol group per aromatic nucleus.

The polyvinyl acetal resins used in this invention are prepared by the reaction of a normally solid polyvinyl alcohol with a lower aliphatic aldehyde having 1 to 6 carbon atoms by methods well known in the polymer art. Illustrative of the aliphatic aldehydes which serve for the purposes of the present invention are formaldehyde, acetaldehyde, propionaldehyde, butyraldehyde, isobutyraldehyde, 2-ethylbutyraldehyde and the like.

It is known that these aldehydes react with the polyvinyl alcohol to acetalize the hydroxyl groups on the chain but leaving a small portion of unreacted hydroxyl groups pendant on the chain. Preferably, the polyvinyl acetals have a minor portion of free hydroxyl groups with a majority of the groups acetalized. It has been found desirable and convenient to employ commercially available polyvinyl butyral resins having an inherent viscosity of about 0.8 to 1.2 when measured according to ASTM D-1243-58T (procedure A) and about 18% by weight of vinyl alcohol groups in their unreacted state. Of course other polyvinyl butyrals having different inherent viscosities and percentages of vinyl alcohol groups can be used, if desired.

The polymethyl ethers of polymethylol melamines are well known in the art as are methods for preparing them. Polymethylol melamines can be prepared by reacting one mol of melamine with at least two mols of formaldehyde. The fully methylolated melamine, such as hexamethylol melamine, can be prepared by reacting at least six moles of formaldehyde with one mole of melamine. In order to obtain the desired methyl ether, the polymethylol melamines thus produced are caused to react with the requisite amount of methanol. The completely etherified hexamethylol melamine, hexamethoxymethylmelamine, is the preferred melamine in this invention, although those with a lesser degree of etherification can also be used.

While a preferred weight relation of the components in the coating composition is about 1 part of polyvinyl butyral, about 4 to 7 parts of phenol-aldehyde condensation product, and about 1.5 to 9 parts of polymethylether of hexamethylmelamine, if desired, other proportions of phenol-aldehyde condensation product and polymethyl ether of hexamethylmelamine can also be used. Although the latter component can be used at higher concentrations no significant improvement in coating properties are realized. For some applications, concentrations as low as 0.5 part of polymethylether of hexamethylmelamine can be used.

The time and temperature required for crosslinking are not critical. For example, about 5–30 minutes at about 75–110° C. can be used. Preferred conditions are about 5 to 15 minutes at about 80–90° C.

Although it is not essential, it has been found useful to employ an acid catalyst to accelerate the crosslinking of the coating composition. For this purpose, acids such as p-toluenesulfonic acid, sulfuric acid, hydrochloric acid (about 0.1 to 0.2 mil thick) were then evaluated as to their adhesion to the polystyrene substrate, resistance to water-blush and resistance to attack by the solvents, ethanol and toluene.

The blush test was carried out by visually examining crosslinked coated polystyrene panels which had been immersed in water at 75° F. for one week. The panels were rated "pass" for those showing no haze or whitening and "fail" for those showing any haze or whitening. Coatings which blush are considered undesirable because the clarity of the styrene polymer article is thus diminished or even destroyed.

The resistance to solvents was tested by filling dishes molded from the crosslinked, coated polystyrene with ethanol or toluene.

Ethanol was chosen to evaluate solvent resistance because it is a coating solvent used in this invention. The crosslinking or curing cycle must render the crosslinked coating ethanol insoluble to withstand the environmental conditions of many practical applications.

After 2 days at 75° F. the dish coatings were examined. The ratings were "pass" for those coatings which were intact and resisted scratching with a spatula tip and "fail" for those which had dissolved in the solvent.

The adhesion test was similar to that described in the Plastics Engineers Handbook, page 639, Reinhold, New York, 1959. A cross was made with one inch scratches on the surface of a flat, crosslinked, coated plaque of styrene polymer. A piece of pressure sensitive tape was then pressed against the cross and rapidly pulled away. If the coating was not detached it was rated "pass," if it did it was rated "fail."

The results obtained with a various coating formulations described in Table 1 were compared with each other and with a control which lacked any hexamethoxymethylmelamine crosslinking agent.

TABLE 1

| Formulation Number | Parts by Weight | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Component: | | | | | | | | | | | | | | | | | | | | | | |
| A one step, heat reactive phenol-formaldehyde condensation product [1] | 10 | 10 | 10 | 10 | 7 | 7 | 7 | 5 | 5 | 5 | 4 | 3 | 2 | 2 | 2 | 1 | 1 | 1 | 1 | 1 | 1 |
| Polyvinyl butyral | 1 | 1 | 1 | 1 | 1 | 1 | 1 | 1 | 1 | 1 | 1 | 1 | 1 | 1 | 1 | 1 | 1 | 1 | 2 | 2 | 2 |
| Hexamethoxymethylmelamine | 0 | 0.5 | 2.2 | 3.3 | 0.5 | 1.6 | 8.8 | 0.5 | 1.0 | 1.5 | 1.6 | 1.6 | 0.5 | 1.0 | 1.5 | 0.5 | 1.0 | 1.5 | 0.5 | 1.0 | 1.5 |
| p-Toluenesulfonic acid | 0 | 0.6 | 0.7 | 0.7 | 0.4 | 0.5 | 0.8 | 0.3 | 0.4 | 0.4 | 0.4 | 0.2 | 0.2 | 0.2 | 0.2 | 0.1 | 0.2 | 0.2 | 0.2 | 0.2 | 0.2 |

[1] Prepared from 1 mole of phenol and 1.5 moles of formaldehyde under alkaline conditions and having a viscosity of 300–450 centipoises, a specific gravity of 1.059–1.068, a flash point of 70° F. (Tag closed cup), a non-volatiles content of 54–58% and a set time of 350 to 650 seconds at 130° C.

and the like can be used in concentrations of about 1 to 10% based on the total weight of the coating composition. It is preferred to use about 5% of p-toluenesulfonic acid or sulfuric acid.

The phenolic-polyvinyl acetal coating composition can be applied to the styrene polymer substrates by methods well known in the art such as slush molding, dip coating, spray coating and the like. A doctor blade or wire wound rod can be employed for the application of smooth coatings to sheets or films of styrene polymer substrates.

The following examples are illustrative of this invention. All parts and percentages are given by weight, unless otherwise specified.

*Example 1*

Various proportions of the coating composition components were dissolved in an ethanol-isopropanol mixture (1:1) to make a solution of about 15% and applied to polystyrene plaques with a wire wound Meyer rod (No. 3). The coating compositions identified in Table 1 were air dried for 5 minutes and then baked for about 10 minutes at about 80 to 90° C. The crosslinked coatings Formulation 1, which contained no hexamethoxymethylmelamine, was completely unsatisfactory in every test. In sharp contrast, formulations containing hexamethoxymethylmelamine, specifically Formulations 7, 10 and 11 displayed excellent characteristics in all tests, i.e., water blush resistance, solvent resistance and adhesion. Some loss in water blush and solvent resistance was observed at high phenol-formaldehyde resin contents i.e., above 7 parts (Formulations 2, 3 and 4) and some loss in adhesion and solvent resistance at phenol-formaldehyde resin levels below 4 parts (Formulations 12 through 21 inclusive).

*Example 2*

The following formulation (Table 2) was applied to plaques of biaxially oriented polystyrene (12″ x 18″ x 0.01″)

with a wire wound Meyer rod, air dried for 5 minutes and baked for 10 to 12 minutes at about 180° F.

TABLE 2

| Component | Parts by Weight | Solids by Weight |
|---|---|---|
| Polyvinyl butyral (20% in isopropanol) | 30.0 | 6 |
| A one step heat reactive Phenol-formaldehyde condensation product [1] (56.7% in ethanol) | 52.8 | 30 |
| Hexamethoxymethylmelamine (25% in ethanol) | 39.6 | 9.9 |
| p-Toluenesulfonic acid (25% in ethanol) | 9.0 | 2.25 |
| Ethanol/butanol (1:1) | 30.0 | 30.0 |

[1] The same product described in Table 1 but dissolved in ethanol.

The coated polystyrene plaques showed no water blushing after immersion in water at 75° F. for one week. They showed no changes after immersion in ethanol for 24 hours. After a 24 hour immersion period in toluene the polystyrene dissolved but the coating was unaffected.

The moisture vapor transmission of the plaques was also measured in units of gm./day/square meter. A control with no coating has a value of 28. Using one coat of the formulation of Table 2 provides a film thickness of about 0.1 mil. The moisture vapor transmission at this thickness was 20. By applying two coats to provide a film of about 0.2 mil a moisture vapor transmission of 18 was obtained. The test procedure used to obtain these data was that described in ASTM E96-53T.

The gas permeability of the Table 2 formulation was determined for the coated polystyrene plaques using dry and wet oxygen and wet nitrogen.

By dry oxygen is meant oxygen at a relative humidity of 0% at 25° C. The wet oxygen and wet nitrogen each at a relative humidity of 100% at 25° C. The results are presented in Table 3 in units of cc./100 sq. in./24 hours.

TABLE 3

| Substrate | Dry Oxygen | Wet Oxygen | Wet Nitrogen |
|---|---|---|---|
| Control, uncoated polystyrene plaque | 30.65 | 20.24 | 21.57 |
| One coat | 23.22 | 23.69 | |
| Two coats | 16.98 | | 20.85 |

The test procedure used to determine gas permeability was that described in ASTM D-1434-58.

*Example 3*

The formulation described in Example 2, Table 2, was used to coat a styrene-acrylonitrile copolymer plaque whose oxygen permeability was then measured. The copolymer sheet thickness was about 30 mils and the coat about 0.1 mil thick. The results in units of cc./100 sq. in./24 hours are given in Table 4.

TABLE 4

| Substrate | Wet Oxygen | Dry Oxygen |
|---|---|---|
| Control, uncoated styrene-acrylonitrile copolymer | 7.57 | 7.00 |
| One coat | 3.00 | 3.85 |

The copolymer used in these experiments contained about 72% styrene, and 28% acrylonitrile and has a reduced viscosity of about 0.85, measured as a solution of 0.2 g. of copolymer in 100 ml. of methyl ethyl ketone at 25° C.

*Example 4*

The formulation described in Table 2 was modified by substituting concentrated sulfuric acid for the p-toluenesulfonic acid and subjected to the same tests as were used for the original formulation. The results were approximately the same.

Although the invention has been described with a certain degree of particularity, it is understood that numerous changes in the formulations and methods of their application to coat styrene polymer substrates can be made without departing from the spirit and scope of the invention.

What is claimed is:

1. The method for preparing solvent resistant, gas impermeable coatings on styrene polymer substrates which comprises contacting said styrene polymer substrates with a composition comprising
   (1) about 1 part by weight of a polyvinyl acetal resin prepared from an aliphatic aldehyde having from 1 to 6 carbon atoms
   (2) about 4 to 7 parts by weight of a heat reactive, ethanol soluble phenol-aldehyde condensation product
   (3) about 1.5 to 9 parts by weight of a polymethyl ether of hexamethylol melamine, and air drying and crosslinking said coating composition.

2. The method claimed in claim 1 wherein the crosslinking step is effected by baking for about 5 to 30 minutes at about 75° to 110° C.

3. A styrene polymer surfaced with a crosslinked coating composition comprising:
   (1) about 1 part by weight of a polyvinyl acetal resin prepared from an aliphatic aldehyde having from 1 to 6 carbon atoms;
   (2) about 4 to 7 parts by weight of a one-step, heat-reactive, ethanol-soluble phenol-aldehyde condensation product; and
   (3) at least about 0.5 part by weight of hexamethoxymethylmelamine.

4. The surfaced polymer claimed in claim 3 wherein the polyvinyl acetal resin is a polyvinyl butyral resin.

5. The surfaced polymer claimed in claim 3 wherein the aldehyde moiety of the one-step, heat-reactive, ethanol-soluble phenol condensation product is formaldehyde.

6. The surfaced polymer claimed in claim 3 wherein the crosslinked coating composition contains about 1.5 to 9 parts by weight of hexamethoxymethylmelamine.

7. The surfaced polymer claimed in claim 3 containing about 1 to 10% based on the total weight of coating composition of an acid crosslinking agent.

8. The surfaced polymer claimed in claim 7 wherein the acid crosslinking catalyst is p-toluenesulfonic acid.

9. The surfaced polymer claimed in claim 7 wherein the acid crosslinking catalyst is sulfuric acid.

10. The surfaced polymer claimed in claim 3 wherein the styrene polymer is a homopolymer of styrene.

11. The surfaced polymer claimed in claim 3 wherein the styrene polymer is a styrene-acrylonitrile copolymer.

References Cited by the Examiner

UNITED STATES PATENTS

| | | | |
|---|---|---|---|
| 2,441,542 | 5/1948 | Lawrence | 260—839 |
| 2,466,399 | 4/1949 | Dunlop | 260—839 |
| 2,917,483 | 12/1959 | Lavin et al. | 260—844 |
| 2,964,491 | 12/1960 | Rylander et al. | 260—844 |
| 3,030,325 | 4/1962 | Scopp | 117—138.8 |

MURRAY TILLMAN, *Primary Examiner.*

J. C. BLEUTGE, *Assistant Examiner.*